(12) United States Patent
Longardner

(10) Patent No.: US 6,355,162 B1
(45) Date of Patent: Mar. 12, 2002

(54) APPARATUS FOR INCREASING THE FLOCCULATION RATE OF SUSPENDED SOLIDS FROM WASTEWATER

(75) Inventor: Robert L. Longardner, Indianapolis, IN (US)

(73) Assignee: RWI, Indianapolis, IN (US)

( * ) Notice: Subject to any disclaimer, the term of this patent is extended or adjusted under 35 U.S.C. 154(b) by 0 days.

(21) Appl. No.: 09/456,356

(22) Filed: Dec. 8, 1999

Related U.S. Application Data

(60) Provisional application No. 60/111,547, filed on Dec. 9, 1998, and provisional application No. 60/147,116, filed on Aug. 4, 1999.

(51) Int. Cl.[7] .................................................. C02F 3/02
(52) U.S. Cl. .................... 210/177; 62/238.3; 62/335; 62/476; 210/180; 210/188; 210/220; 261/129; 261/157; 261/161
(58) Field of Search ................................ 210/612, 766, 210/177, 180, 188, 220; 261/128, 129, 157, 161; 62/238.3, 335, 476

(56) References Cited

U.S. PATENT DOCUMENTS

| | | | |
|---|---|---|---|
| 4,275,310 A | 6/1981 | Summers et al. | 290/1 R |
| 4,486,310 A * | 12/1984 | Thorton | 210/604 |
| 4,849,648 A | 7/1989 | Longardner | 290/54 |
| 4,936,109 A | 6/1990 | Longardner | 62/238.3 |
| 5,240,600 A * | 8/1993 | Wang et al. | 210/188 |
| 5,800,705 A * | 9/1998 | Downs | 210/177 |
| 6,082,094 A | 7/2000 | Longardner et al. | 60/39.33 |

* cited by examiner

Primary Examiner—Peter A. Hruskoci
(74) Attorney, Agent, or Firm—Baker & Daniels

(57) ABSTRACT

A wastewater aerating system that conditions air inlet to a blower of the system to adjust the condition of air discharged into the wastewater so as to increase the flocculation rate of suspended solids from the wastewater. The wastewater aeration system includes a conduit having an outlet submerged within a bath of wastewater to be treated, an air duct inlet in flow communication with a source of ambient air, a blower operable to cause air to pass through the air duct and through the conduit to be output through the conduit outlet into the bath of wastewater, and at least one heat exchanger installed in the air duct and adapted to condition, such as condense its vapor and sensibly cool, the air passing through the air duct. A method of treating a bath of wastewater is also disclosed.

12 Claims, 3 Drawing Sheets

APPARATUS FOR INCREASING THE FLOCCULATION RATE OF SUSPENDED SOLIDS FROM WASTEWATER

CROSS-REFERENCE TO RELATED APPLICATIONS

This application claims the benefit under 35 U.S.C. §119 (e) of U.S. Provisional Application No. 60/111,547, filed Dec. 9, 1998, and U.S. Provisional Application No. 60/147,116, filed Aug. 4, 1999.

BACKGROUND OF THE INVENTION

The present invention pertains to wastewater treatment, and, in particular, to an apparatus that introduces oxygen into the wastewater to increase the flocculation rate of suspended solids.

Sewage treatment by means of flocculation removes dissolved and suspended solids from wastewater. Such treatment frequently takes place at a wastewater treatment facility in a rectangular secondary tank downstream from the primary treated wastewater, which tank may be continuously seeded with bacteria-laden activated sludge to augment growth of the bacteria that oxidizes the organics and inorganics in the wastewater to achieve flocculation of the waste. Flocculate of activated sludge depends upon gravitational effects and settles on the tank bottom from where it is scraped off and pumped to another tank or digester for a subsequent anaerobic treatment or disposal. The flocculation rate depends upon the biological aspect of the solids being treated, and the environment and life supporting habitat within the wastewater for the bacteria that in effect devours the organic carbon and other suspended solids.

In particular, in order to increase the rate of flocculation of the activated sludge, wastewater treatment processes frequently involve aeration to provide oxygen for the growth of the bacteria seedings. The provided oxygen is diffused into the wastewater and in combination with the dissolved oxygen provides life support for the bacteria that produces the flocculation of the waste. The replenishment of suspended oxygen along with the dissolved oxygen fosters the respiration of the bacteria that impacts the retention time needed for flocculation, which time is based upon numerous other factors including the characteristics of the sewage being treated, hydrostatic head, compressed air discharge temperatures, and net diffuser discharge pressure.

One known wastewater aeration system is diagrammatically shown in FIG. 1. Concrete reservoirs or baths 10, each of which may be one of many in a series of similarly constructed baths, each holds a quantity of wastewater 12, such as domestic sewage, being treated. Air supply pipes 18 include at their respective downstream ends a diffuser section 16 submerged within the wastewater 12. The diffuser sections 16 include a multitude of small orifices through which air is output or bubbled into the wastewater. Although only one supply pipe and diffuser for each reservoir is shown in FIG. 1 for illustration purposes, multiple pipes and/or diffusers may be used to provide an adequate amount and distribution of aerating air. Each of the air supply pipes 18 is connected to a distribution manifold 20 connected to a large diameter duct 22 that is supplied with pressurized air from a blower or centrifugal compressor 24. A filtered intake duct 26 that ports or opens to the outside where ambient air is connected to compressor 24.

During operation, compressor 24 draws ambient air into duct 26, which air then passes in sequence through compressor 24, duct 22, manifold 20, and supply pipes 18. The blower conveyed air continues out through diffuser sections 16 in the form of bubbles, shown at 30, that bubble or percolate upward through wastewater 12 to provide oxygen for the respiration of the bacteria within the wastewater.

While the prior art aeration system shown in FIG. 1 does on occasion provide some benefit, its effectiveness at treating the wastewater is sometimes limited. Specifically, the respiration of the bacteria in the wastewater is at optimum in a habitat of around 68° F. (20° C.) to a high of around 140° F. (60° C.).

Except for some rare heat resistant strains of bacteria, higher temperatures may harm or kill the bacteria within a short period of time. However, in the prior art of FIG. 1, the heat of compression incidentally applied to the aerating air by the blower may, depending on ambient air conditions, increase the temperature of the air reaching the diffuser and the wastewater to undesirably high levels at which bacteria respiration is hindered, or the bacteria is killed, and the solubility of dissolved oxygen is diminished. For example, in some situations and blower configurations, air output from the diffuser will have a dry bulb temperature of in excess of 155° F. when ambient air has a dry bulb temperature of as low as 70° F. Although such diffuser output temperatures may not measurably change the overall temperature in the tank so as to adversely affect all the bacteria therein, bacteria passing near the diffusers will be subjected to thermal shock.

Another shortcoming of existing aeration systems is related to the net diffuser discharge pressure, which is the difference between the discharge pressure at the diffuser orifices and the wastewater hydrostatic pressure. The pressure delivered by a centrifugal blower is dependent on the intake ambient air mixture density and specific humidity, which density is a function of the temperature and humidity of the ambient air. Under some ambient conditions, such as high temperature with high humidity, pressure losses due to high temperatures and vapor condensation downstream of the blower result in the net diffuser discharge pressure being insufficient to produce bubbles or to prevent wastewater from clogging the air distribution pipes. Under certain other ambient conditions, the net diffuser discharge pressure is so high that the diameter of the diffused air bubbles are too large and the wastewater is made too turbulent for efficient absorption of oxygen into the wastewater.

Still another shortcoming of existing aeration systems is related to the fact that classical adiabatic blowers ingest air at constant volumes. Because the density of air varies with temperature, the mass of air conveyed by the blower varies with temperature. As the temperature and relative humidity of air inlet to the blower increases, the mass of air and therefore oxygen delivered to the diffuser for introduction into the wastewater for use by the bacteria undesirably decreases. And, although the horsepower required to compress this less dense mass flow is reduced, its rate of decline is much less than that of the mass flow.

Thus, it would be desirable to provide a wastewater aeration system that overcomes these and other shortcomings of the prior art.

SUMMARY OF THE INVENTION

The present invention provides a wastewater aeration system that improves the flocculation rate of suspended solids within the wastewater by conditioning an intake air flow prior to its introduction into the compressor of the aeration system. The intake air is conditioned by a vapor condensing heat exchanger within the air stream that de-hydrates and cools the air to a desired level. Another and optional heat exchanger positioned within the air stream more downstream of the vapor condensing heat exchanger will secondarily sensibly cool the air stream upstream from the bell-mouth of the compressor. The inventive heat exchangers may also be configured to heat the air stream when ambient conditions are cooler than desired.

In one form thereof, the present invention provides a wastewater treatment system for a bath of wastewater, including a conduit having an outlet opening into the bath of wastewater, an air duct having an inlet in flow communication with a source of air, at least one blower in flow communication with the air duct and the conduit and operable to cause air to pass through the air duct and through the conduit to be output through the conduit outlet into the bath of wastewater, and a heat exchanger installed in the air duct and adapted to condition air passing through the air duct.

In another form thereof, the present invention provides a wastewater aerating system including a conduit having at least one outlet submerged within a bath of wastewater to be treated, an air duct having an inlet in flow communication with a source of ambient air, at least one blower in flow communication with an air duct outlet and a conduit inlet and operable to cause air to pass through the air duct and through the conduit to be output through the at least one outlet of the conduit into the bath of wastewater, and at least one heat exchanger installed in the air duct and adapted to condition air passing through the air duct, whereby the temperature of the conditioned air reaching the at least one blower is modulated by the at least one heat exchanger to promote flocculation of suspended solids from the wastewater when the conditioned air is output into the bath of wastewater.

In still another form thereof, the present invention provides a method of treating a bath of wastewater including the steps of providing a conduit having an upstream end in communication with a source of ambient air and a downstream end opening into the bath of wastewater below the wastewater surface, inletting ambient air into the conduit through the upstream end, moving the inlet air through the conduit from the upstream end to the downstream end, outletting air from the conduit into the bath of wastewater through the downstream end, and conditioning the air moved through the conduit such that the air outlet from the conduit is at a temperature that promotes flocculation of suspended solids from the wastewater.

One advantage of the present invention is that it provides a water aeration system that is cost effective to operate.

Another advantage of the water aeration system of the present invention is that it either reduces compressor brake horsepower required to aerate a given tank, or results in an increased compressed air output at the diffuser in the tank for a given installed compressor horsepower, Another advantage of the water aeration system of the present invention is that by increasing the amount of suspended oxygen that is introduced into the wastewater and thereby improving the habitat for the flora of bacteria therein, the flocculation rate of suspended solids is increased so as to essentially increase the capacity of the wastewater plant by decreasing the required retention time of the wastewater within the plant.

Another advantage of the present invention is that it provides a water aeration system that within a normal range of ambient air conditions will deliver air at a relatively constant net diffuser discharge pressure and temperature to a diffuser immersed in a bath of wastewater, thereby providing a suitable air quality for suspending oxygen into the wastewater, a reduction of thermal shock on the piping system, an even flow of air through the diffuser, a reduction of head loss due to air-side fouling, a reduction of power consumption due to liquid-side fouling, a suitable oxygen transfer efficiency to the wastewater, a suitable bubble formation with reduced vapor content at the diffuser, and a reduction in vapor condensation in the piping.

Another advantage of the water aeration system of the present invention is that it delivers air to the diffuser at temperatures less likely to create a thermal shock to the flora of bacteria.

Another advantage of the present invention is that it provides for an increased suspended oxygen supply to the flora of bacteria their respiration temperature.

Another advantage of the present invention is that it may lower the temperature of the air stream outlet at the diffuser, thereby lessening the turbulence of the water column and consequently increasing the settle rate of flocculate from the wastewater.

Still another advantage of the present invention is that it controls the diameter of the diffused air bubbles, thereby permitting a less violent action of bubble formation for a more efficient absorption rate of oxygen into the wastewater.

Still another advantage of the present invention is that it reduces turbulence and churning of the wastewater which diminishes the stillness required for sedimentation of the flocculate.

BRIEF DESCRIPTION OF THE DRAWINGS

The above mentioned and other advantages and objects of this invention, and the manner of attaining them, will become more apparent and the invention itself will be better understood by reference to the following descriptions of embodiments of the invention taken in conjunction with the accompanying drawings, wherein.

Figure 1:
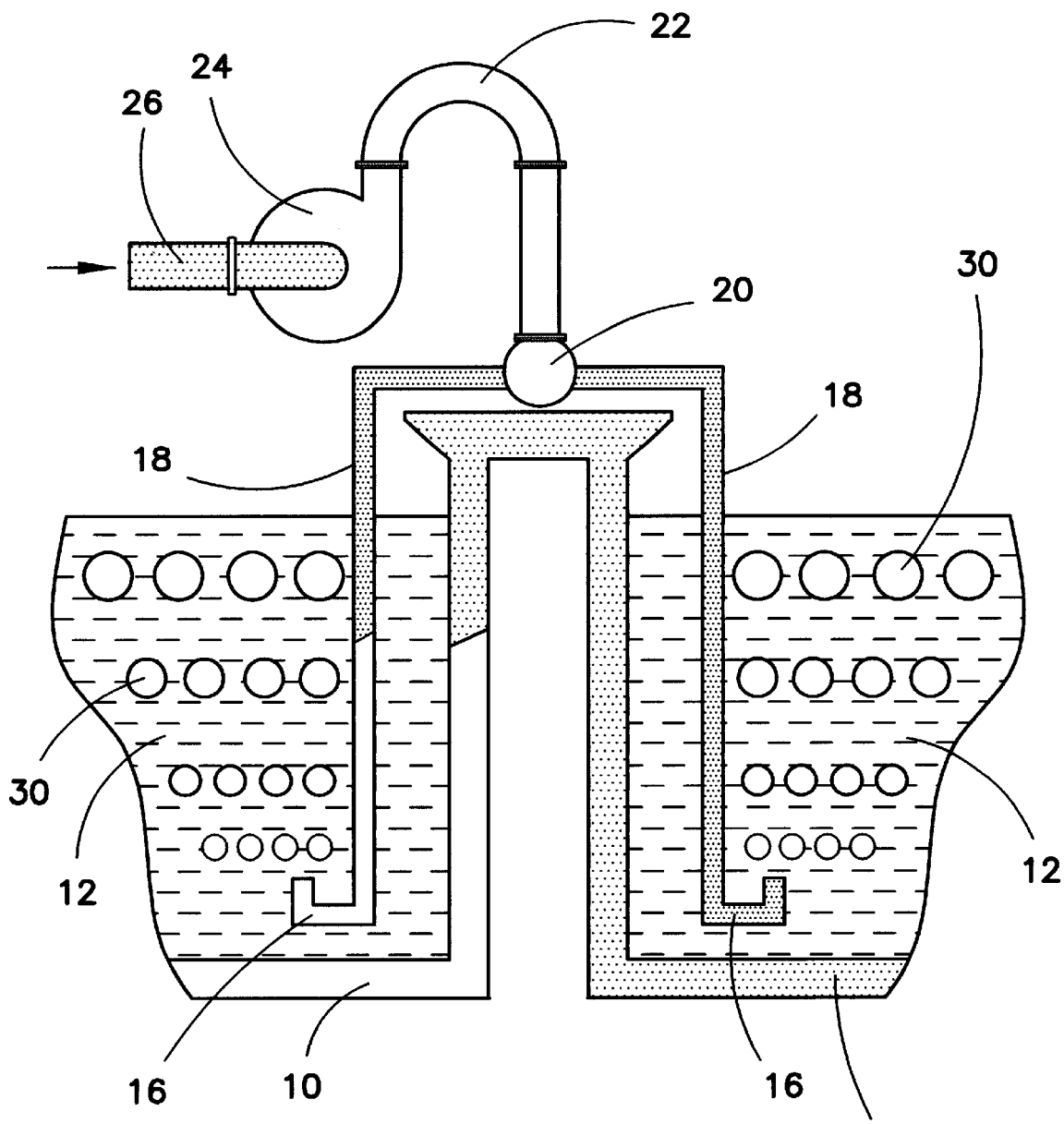
FIG. 1 is a diagrammatic front view, in partial cross-section, of a prior art aeration system for treating wastewater.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

Figure 2:
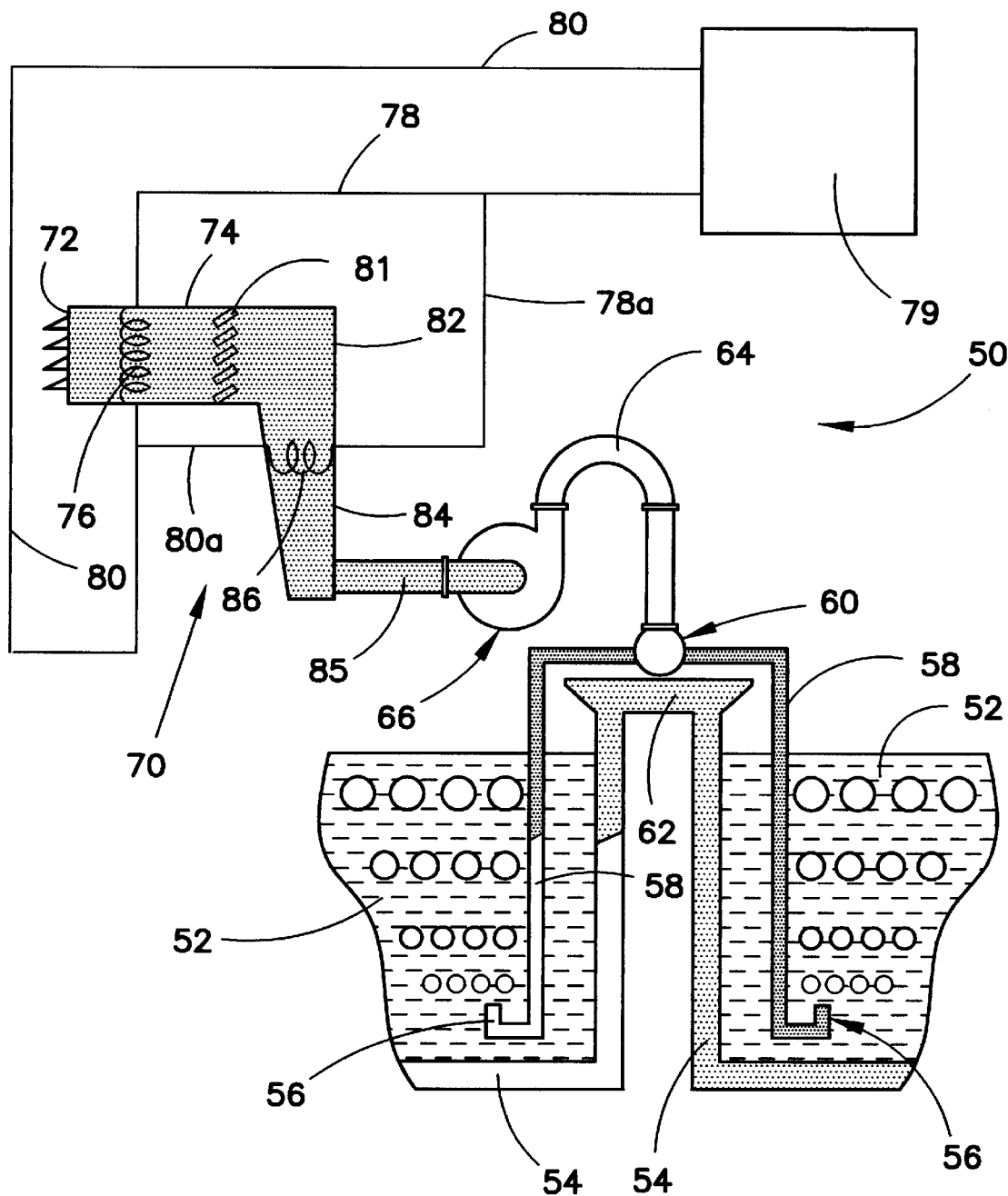
FIG. 2 is a diagrammatic front view, in partial cross-section, of portions of a wastewater aeration system of the present invention.

Referring now to FIG. 2, there is diagrammatically shown selected portions of one embodiment of a wastewater aeration system, generally designated 50, of the present invention. In this embodiment, various aeration system components of the prior art shown in FIG. 1 have been supplemented with an air treating or conditioning system disposed upstream of the blower which functions to provide the aeration system with improved aerating capabilities even during adverse environmental operating conditions possibly experienced by the system.

In FIG. 2, wastewater aeration system 50 is shown being used to treat domestic sewage 52 contained in a series of similarly constructed secondary treatment cells or reservoirs 54 made of concrete. Reservoirs 54 depict secondary tanks that are downstream of the primary treated wastewater in a municipal wastewater treatment plant or facility. While only two cells are partially shown in FIG. 2 to facilitate illustration, such cells are representative of additional cells that may be provided for sewage retention. This shown and described configuration is intended to be illustrative and not limiting, however, as the present invention may be used in treating wastewater other than domestic sewage, such as industrial sewage and other polluted water that will become septic by nature, and further may be employed in other locations where wastewater is collected, such as in the primary tanks of the treatment plant or in lift stations.

Aeration system 50 includes an air diffuser 56 fitted to the downstream end of an air supply pipe 58 that extends into each reservoir 54. Diffuser 56, which is provided with orifices through which air bubbles into the wastewater, is shown submerged within a lower region of the wastewater 52 to allow a relatively large depth of the wastewater to be subjected to air percolation and suspended oxygen, but within the scope of the present invention may be positioned below the surface at depths of the wastewater other than as shown. The quantity, placement and configuration of each of pipe 58 and diffuser 56 may be selected by one of skill in the wastewater treatment art to achieve a suitable distribution of aerating air.

Air supply pipes 58 are connected to a distribution manifold 60 that is supported on a landing 62 between the adjacent cells 54. A large diameter air duct 64 connects a blower or centrifugal compressor 66 to manifold 60. Although only one blower is shown, multiple blowers may be provided if required to efficiently move the aerating air. Blower 66 is furnished with a supply of conditioned air through an ambient air conditioning assembly generally indicated at 70.

Assembly 70 includes a louvered air inlet 72 at an upstream end of duct 74 which opens to the outdoors and its ambient air. Ambient air drawn through louvered inlet 72 by operation of blower 66 passes through a not shown air filter and over or through a heat exchanger abstractly shown at 76. As for most applications it is envisioned that the conditioning of the ambient air will be in the form of a de-hydrating and a cooling of the air, heat exchanger 76 is further described herein as a vapor condensing heat exchanger.

Vapor condensing heat exchanger 76 may be of any conventional design known in the heat exchanger art that promotes dehydration and cooling of a passing air flow. Heat exchanger 76 is abstractly shown as a cooling coil over which air flows and which provides a circuitous path for relatively low temperature chillant or coolant being carried therethrough. Cooling coil 76 may be provided by cooling coil tube sections that are arranged in rows and columns in the air duct and oriented to be generally transverse to the flow of ambient air being drawn through inlet 72. The cooling coil tube sections may be arranged, for example, to vertically or horizontally extend and with spacing between the cooling coil tube sections to provide a large surface area for contact with passing air. Cooling coil 76 is supplied with coolant through a thermally insulated inlet line 78 connected to a source of low temperature coolant abstractly indicated at 79. A thermally insulated return line 80 routes coolant that is heated during its use in cooling coil 76 back to the source of coolant 79 for reuse. Although single inlet and outlet coolant lines for heat exchanger 76 are shown, multiple inlet lines and outlet lines may be used and separately circuited to the coil tube sections within the scope of the present invention.

Vapor condensing heat exchanger 76 is sized and arranged to condition the intake air flowing through assembly 70 to improve the aerating performance of the system. After passing heat exchanger 76, the conditioned air is preferably at the conditions desired of air to be input to the suction side of blower 55 as described below.

The near arid conditioned air emerging from heat exchanger 76 then flows through a straight length of duct 74 of assembly 70. Demisters generally indicated at 81 are arranged within duct 74 to further remove water vapor within the flowing air. Auxiliary insulation specification dampers, controls and backwashing cleaning components that are frequently parts of existing air duct systems in other arts may be employed within assembly 70, but are not shown for purposes of illustration. As the air flow reaches the end of the straight initial portion of duct 74, it encounters a ninety degree bend section 82 which is in air flow communication with a duct section 84 with a flow converging geometry. Although shown as having a ninety degree bend, bend section 82 may bend at other angles. In addition, the bend section may be eliminated such that the duct with the flow converging geometry is in line with duct 74. Duct section 84 ports to a pipe 85 that inlets to the bell mouth or suction side of blower 66, but in an alternate, not shown embodiment may port directly into the bell mouth of blower 66.

Disposed within duct section 84 is a second sensible cooling heat exchanger 86. Due to the exposure of the periphery of air duct 74 to ambient air, as well as the air flow being subject to impediments, the air being conveyed through air duct 74 downstream of heat exchanger 76 may rise in temperature. Heat exchanger 86, which may include one or more cooling coils arranged in a similar fashion to the coil of the vapor condensing heat exchanger 76, is configured to re-cool to the desired blower intake air temperature the air passing through the assembly 70 which has previously been conditioned by heat exchanger 76. Heat exchanger 86 may be eliminated if heat exchanger 76 achieves satisfactory cooling of the air reaching blower 66. Heat exchanger 86 is shown plumbed to coolant source 79 in parallel with heat exchanger 76 by way of insulated inlet line 78a and insulated outlet line 80a, but may be plumbed in series in alternate embodiments.

Heat exchangers 76 and 86 are suitably sized and shaped, and controlled with a not shown controller, to condition the air such that for any ambient conditions, the air outlet through diffuser 56, despite the air heating associated with compression by blower 66, is at a controlled temperature that preferably is not unacceptably high, such as a temperature that might cause significant harm to the working bacteria in the wastewater 52, and further is at a suitable discharge pressure at the diffuser. Although not shown, automatic controls with appropriate sensors, such as external to assembly 70 for monitoring ambient conditions or internal to duct 74 for monitoring the conditioned air, may be provided and circuited with the shown system to control the flow of coolant to the heat exchangers to insure that air inlet into blower 66 has the appropriate air properties at all times during blower operation. For example, sensors provided within air pipe 85 can be connected with a control system that automatically provides greater or lesser, depending upon the sensor readings, heat exchanging capabilities to the sensible cooling heat exchangers 76 and 86 in order to optimize the air intake to the blower 66 to the selected characteristics.

In a preferred embodiment, for any and varying ambient conditions, the conditioned air reaching blower 66 is modulated at all times to be at one or more temperatures selected or programmed by a user. When operating within higher ambient temperatures, suitable conditions of the air inlet to blower 66 include a temperature of preferably between approximately 45° F. and 55° F., and more preferably of about 50° F., and a relative humidity of one hundred percent. Temperatures outside this range may be used within the scope of the present invention. For such 50° F. and 100% RH conditions, in aeration systems employing a blower having a compression ratio of 1.69: 1, the temperature of air output at the diffusers is about 134° F., at which temperature bacteria typically will not be thermally shocked. Additionally, these air characteristics at the blower provide an increased quantity of oxygen output through diffuser 56 than for warmer air. For example, assuming a sea level pressure of 14.7 psia, a barometric pressure of 14.5 psia, a blower inlet suction pressure of 14.3 psia, a diffuser discharge pressure of 24.7 psia and a blower compression ratio of 1.69:1, inletting about seven thousand cubic feet per minute of air into blower 66 at 50° F. and 100% Relative Humidity instead of 104° F. and 85% RH results in over a sixteen percent increase in the amount of oxygen supplied to the wastewater through diffuser 56.

Blower inlet air conditions of 50° F. and 100% RH advantageously result in diffuser air discharge temperatures even lower than 134° F. when the compression ratio of the blower is less than 1.69:1, thereby making thermal shock even more unlikely. For such lower compression ratio blowers, and preferably while ensuring the diffuser air will still be discharged at temperatures below about 135° F.–140° F. to reduce the likelihood of thermal shock to the bacteria, the temperature of the blower inlet air maintained by the system may within the scope of the invention be even greater than the preferred temperature range limit of 55° F. listed above. Even lower blower inlet air temperatures than 45° F. may be used if it is desired to further increase oxygen throughput to the diffuser for variously configured blowers. Although blowers having compression ratios greater than 1.69:1 that are fed intake air that has been cooled to 50° F. and 100% RH will deliver to the diffusers air that is at temperatures possibly above 140° F. which may cause thermal shock, for purposes of avoiding thermal shock such diffuser air temperatures are better than the temperatures of air discharged if the blower inlet had not been cooled by the present invention.

Coolant source 79 preferably provides inlet lines 78 and 78a with a cooled working fluid such as water at a temperature of typically between about 42° F. and 46° F. Coolant source 79 may be furnished in any manner that is known in the cooling arts. One suitable manner is in the form of an absorption refrigerator or chiller system, the general configuration and workings of which are further described in U.S. Pat. No. 4,936,109, the entire teachings of which are incorporated herein by reference. The absorption chiller, in addition to potentially being directly heated with standard fuel sources, may in an alternate embodiment be heated by the gas produced within a digester tank element that forms a part of many conventional wastewater treatment systems with which the aeration system of the present invention may find beneficial application.

Other suitable manners of furnishing coolant source 79 include vapor compression refrigeration equipment, as well as using natural sources of cooling fluid such as low temperature groundwater, lake water or potentially the wastewater being treated. For example, the operation of a pump could deliver cooler groundwater as a coolant to the heat exchangers.

Figure 3:
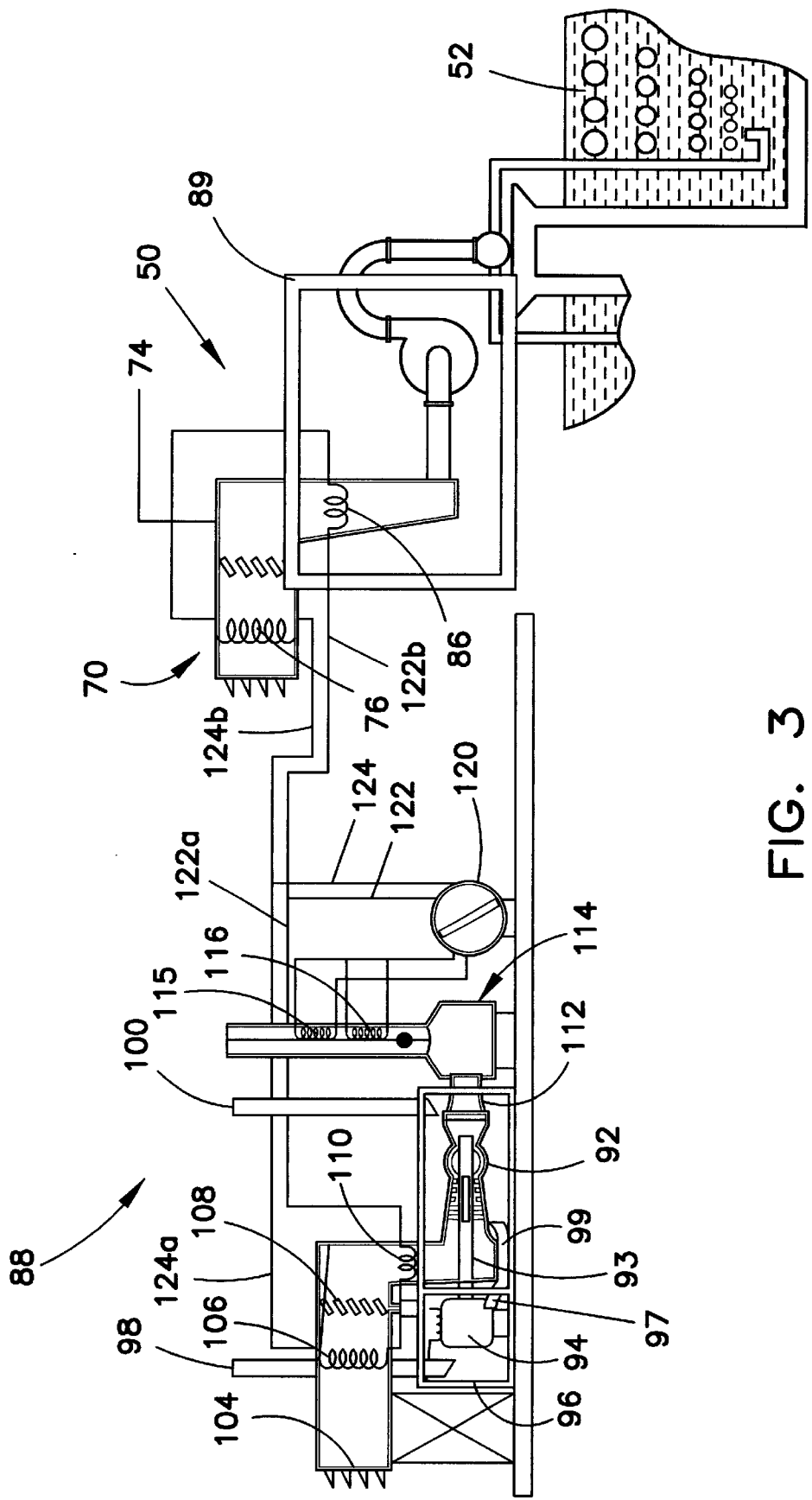
FIG. 3 is diagrammatic view illustrating one embodiment of the components used to produce coolant for the wastewater aeration system of FIG. 2.

Referring now to FIG. 3, there is shown one suitable and near non-parasitic way in which an absorption chiller is powered, as well as plumbed, to provide coolant to heat exchangers 76 and 86 of a water aeration system similar to that shown in FIG. 2, portions of which system are shown enclosed in a protective housing 89. In particular, the coolant is created using the waste heat stream of a combustion turbine or air breathing heat engine of a power generation system, generally indicated at 88, that is located on site at the wastewater treatment facility and operated to service the electric needs of the facility.

Although the overall configuration of certain relevant portions of the power generation system shown in FIG. 3 is more fully described in U.S. Pat. application Ser. No. 09/102,428, the entire teachings of which are incorporated herein by reference, power generation system 88 generally includes a combustion turbine abstractly shown at 92 that utilizes the heat of compression gases from its combustor to drive the shaft indicated at 93. Shaft 93 is drivingly connected to a generator 94 from which generated electricity is drawn to operate the facility. Turbine 92 operates in the stationary mode and is fixedly mounted to a support surface or ground during use. Turbine 92 and generator 94 are housed within a compartmentalized enclosure 96.

Ambient air introduced into enclosure 96 through inlet 97 passes through the enclosure compartment housing generator 94 so as to cool the enclosure and the enclosed generator, and is then exhausted to the atmosphere through stack 98. Ambient air similarly introduced into enclosure 96 through inlet 99 passes through the enclosure compartment housing turbine 92 so as to cool the enclosure and the enclosed turbine, and is then exhausted to the atmosphere through stack 100. Inlets 97 and 99 may deliver ambient air that has previously been cooled by contact with a heat exchanger positioned in the duct connecting the inlets to the source of ambient air. In an alternate embodiment not shown, ambient air cooled by a heat exchanger in an intake duct is routed through a non-compartmentalized or common enclosure to cool the generator and turbine in the manner described in U.S. Pat. application Ser. No. 09/102,426, the entire teachings of which are incorporated herein by reference.

Ambient air is also delivered to the turbine for operation by way of a duct system including a louvered air inlet 104. Ambient air drawn through inlet 104 passes through a filter and over a first heat exchanger 106 that condenses vapor in and sensibly cools the air flow, past demisters 108, and past a heat exchanger 110 that sensibly re-cools the air passing through the duct system.

The exhaust of turbine 92 is ported through enclosure 96 via conduit 112 to a waste heat recovery unit and stack exhaust system generally designated 114 that exhausts to the atmosphere. A pair of heat exchangers 115, 116 circuited in parallel with the absorption chiller are positioned within a flue of the exhaust stack and are used to draw heat from gases being exhausted in order to power the absorption chiller or refrigeration unit, abstractly shown at 120, that is connected in a conventional fashion to a not shown cooling water tower.

The low temperature coolant supply line 122 from chiller 120 is plumbed via line 122a to supply coolant in series to heat exchangers 110 and 106 in the air duct of power generation system 88, and via line 122b to supply coolant in series to heat exchangers 86 and 76 in the wastewater aeration system assembly 70. Warmed coolant is returned from the various heat exchangers via return lines 124a and 124b that communicate with return line 124 to chiller 120.

While this invention has been shown and described as having multiple designs, the present invention may be further modified within the spirit and scope of this disclosure. For example, in situations where inlet ambient air is actually below the desired temperature of air reaching blower 66, heat exchangers 76 and 86 may be heating coils circuited with a source of high temperature fluid or an electrical power source if such coils use resistance heating. In addition, both a heating coil and a cooling coil may be employed within a single wastewater aeration system of the present invention such that the heating coil is selectively used when ambient conditions are cooler and the cooling coil is selectively used when ambient conditions are warmer. Still further, rather than using heat exchangers supplied with coolant in the manner described above to density the air inlet to the blower, other techniques to perform air densification may be employed despite their limitations. For example, adiabatic cooling in which water is sprayed in the ducted intake air stream, or the use of a cooling system in which vapor is first condensed and then a sensible cooling is accomplished by refrigeration means bringing the air mass to the design temperature, may be used to sensibly lower the temperature of air introduced to the blower. This application is therefore intended to cover any variations, uses, or adaptations of the invention using its general principles. Further, this application is intended to cover such departures from the present disclosure as come within known or customary practice in the art to which this invention pertains.

What is claimed is:

1. A wastewater treatment system for a bath of wastewater, comprising:
    a conduit having an inlet and an outlet, said conduit outlet opening into the bath of wastewater;
    an air duct having an inlet and an outlet, said air duct inlet in flow communication with a source of air;
    at least one blower in flow communication between said air duct outlet and said conduit inlet, said at least one blower operable to cause air to pass through said air duct and through said conduit to be output through said conduit outlet into the bath of wastewater; and
    a heat exchanger installed in said air duct and adapted to condition air passing through said air duct into said at least one blower.

2. The wastewater treatment system of claim 1 wherein said heat exchanger is in flow communication with a coolant source providing coolant to said heat exchanger at a lower temperature than the temperature of air passing through said air duct over said heat exchanger, and wherein said heat exchanger comprises a vapor condensing and sensible cooling heat exchanger.

3. The wastewater treatment system of claim 2 further comprising a supplementary heat exchanger supplied with coolant, said supplementary heat exchanger installed in said air duct downstream from said heat exchanger and adapted to provide sensible cooling of air passing through said air duct to counteract temperature increases experienced by air within said air duct as the air continues downstream from said upstream heat exchanger.

4. The wastewater treatment system of claim 2 wherein said heat exchanger installed in said air duct is connected to an absorption refrigeration system.

5. A wastewater aerating system comprising:
    a conduit having an inlet and at least one outlet, said at least one outlet submerged within a bath of wastewater to be treated;
    an air duct having an inlet and an outlet, said air duct inlet in flow communication with a source of ambient air;
    at least one blower in flow communication between said air duct outlet and said conduit inlet, said at least one blower operable to cause air to pass through said air duct and through said conduit to be output through said at least one outlet of said conduit into the bath of wastewater; and
    at least one heat exchanger installed in said air duct and adapted to condition air passing through said air duct, whereby the temperature of the conditioned air reaching said at least one blower is modulated by said at least one heat exchanger to promote flocculation of suspended solids from the wastewater when the conditioned air is output into the bath of wastewater.

6. The wastewater aerating system of claim 5 wherein said at least one heat exchanger is connected to a source of coolant such that the temperature modulation comprises a cooling of the ambient air.

7. The wastewater aerating system of claim 6 wherein said at least one heat exchanger comprises a first heat exchanger and a second heat exchanger, wherein said first heat exchanger is installed in said air duct and adapted to provide a vapor condensing and a sensible cooling of air passing through said air duct, and wherein said second heat exchanger is installed in said air duct downstream from said first heat exchanger and adapted to provide a sensible cooling of air passing through said air duct, whereby said second heat exchanger counteracts temperature increases experienced by air within said air duct as the air continues downstream from said first heat exchanger.

8. The wastewater aerating system of claim 7 wherein said second heat exchanger is positioned at a location within said air duct immediately upstream of said at least one blower.

9. The wastewater aerating system of claim 7 wherein the source of coolant for each of said first heat exchanger and said second heat exchanger comprises an absorption refrigeration system.

10. The wastewater aerating system of claim 5 further comprising at least one demister within said air duct at a location between said first heat exchanger and said second heat exchanger.

11. The wastewater aerating system of claim 10 wherein the conditioned air reaching said at least one blower comprises a relative humidity of about one hundred percent.

12. The wastewater aerating system of claim 5 wherein the conditioned air reaching said at least one blower comprises a temperature of about 50° F.

* * * * *

UNITED STATES PATENT AND TRADEMARK OFFICE
CERTIFICATE OF CORRECTION

PATENT NO. : 6,355,162 B1  Page 1 of 1
DATED : March 12, 2002
INVENTOR(S) : Longardner It is certified that error appears in the above-identified patent and that said Letters Patent is hereby corrected as shown below:

<u>Column 9,</u>
Line 13, delete "wanner" and substitute -- warmer --

Signed and Sealed this

Twenty-first Day of May, 2002

Attest:

JAMES E. ROGAN
*Attesting Officer*   *Director of the United States Patent and Trademark Office*